United States Patent [19]
Maxwell

[11] 3,910,119
[45] Oct. 7, 1975

[54] RECORDING THERMOMETER
[75] Inventor: William H. Maxwell, West Los Angeles, Calif.
[73] Assignee: Cargo Graphics Corporation, Los Angeles, Calif.
[22] Filed: May 15, 1972
[21] Appl. No.: 253,202

[52] U.S. Cl. ............................ 73/343.5; 346/33 TP
[51] Int. Cl. ............................................ G01k 1/02
[58] Field of Search........ 73/343.5, 391; 346/33 TP, 346/112

[56] References Cited
UNITED STATES PATENTS
2,060,984  11/1936  Fraher .............................. 73/343.5
2,557,437  6/1951   Jepson ................................ 346/112
FOREIGN PATENTS OR APPLICATIONS
3,089  2/1887  United Kingdom................. 73/343.5

Primary Examiner—S. Clement Swisher
Assistant Examiner—Denis E. Corr

[57] ABSTRACT

A thermograph for automatically recording variations of temperature correlated with the passage of time and characterized by a light weight and durable construction protectively combined with a shipping container which serves as a housing enclosing the instrument while exposing a heat transfer element for quick response and a direct recording of prevailing temperature upon a chart. The instrument is a permanent and reuseable unit that is carried within the expendible shipping container to produce a thermogram from a prepared chart of pressure sensitive material that is transported over a thermometer stylus by means of a clock motor drive.

8 Claims, 23 Drawing Figures (PREPARATORY CONDITION)

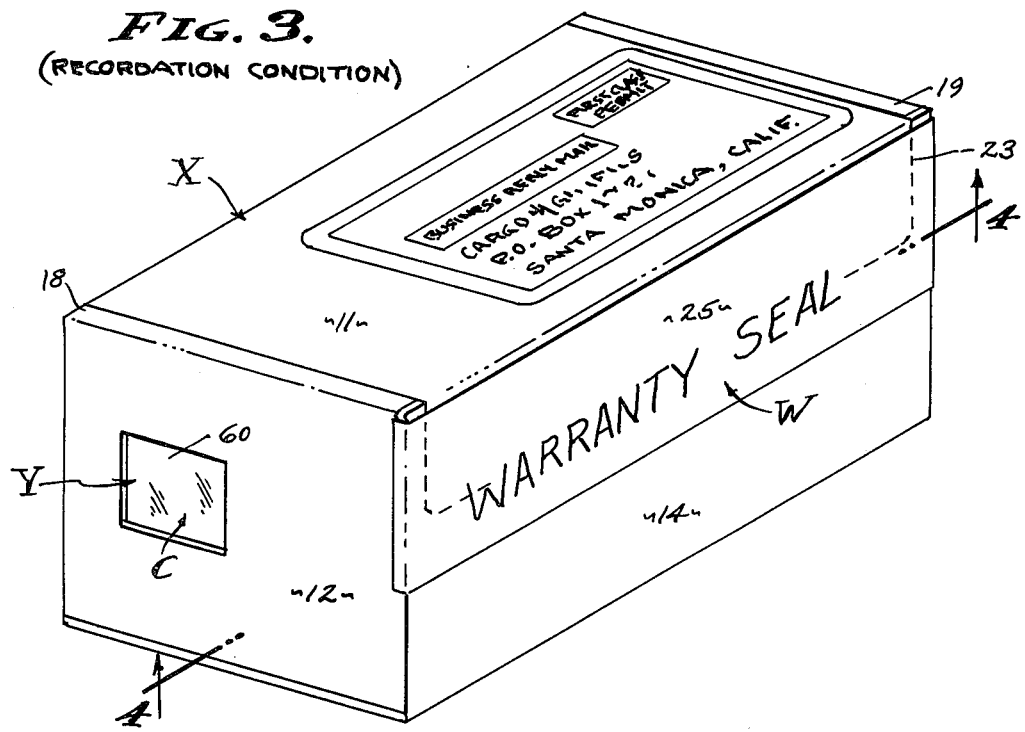
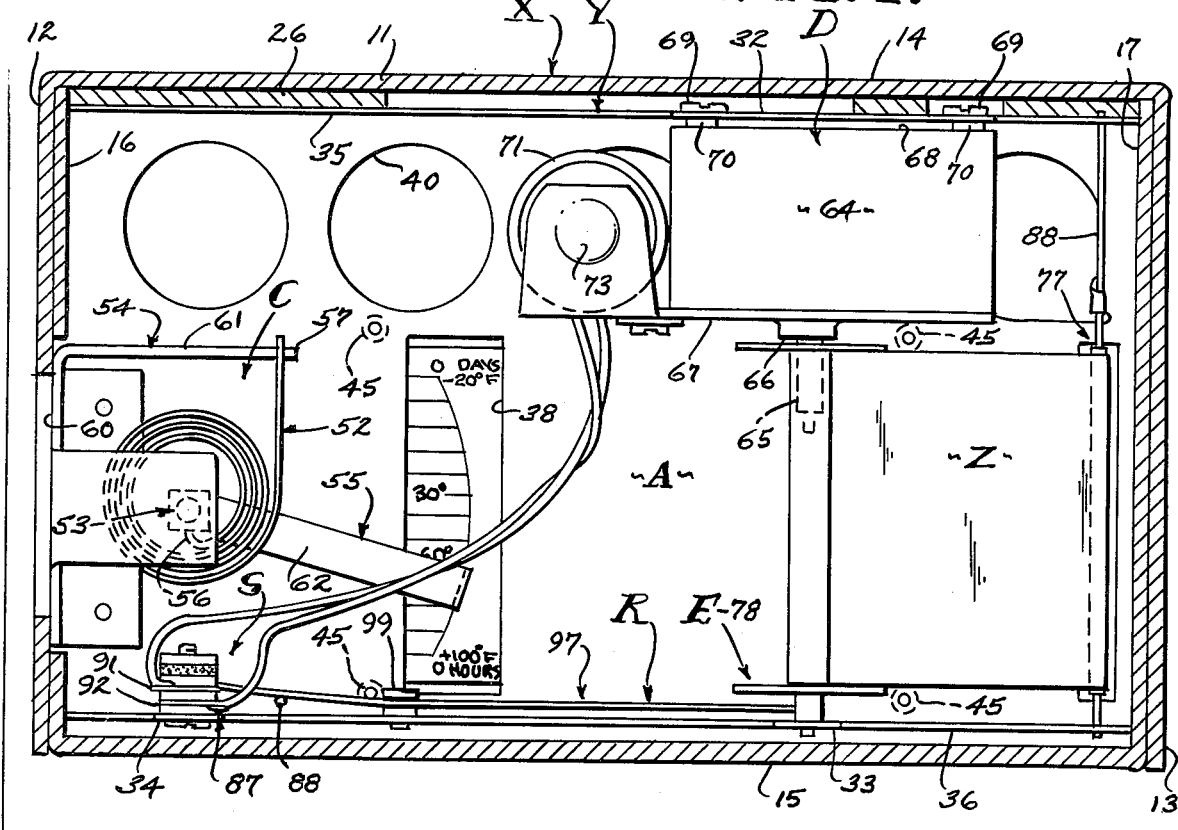

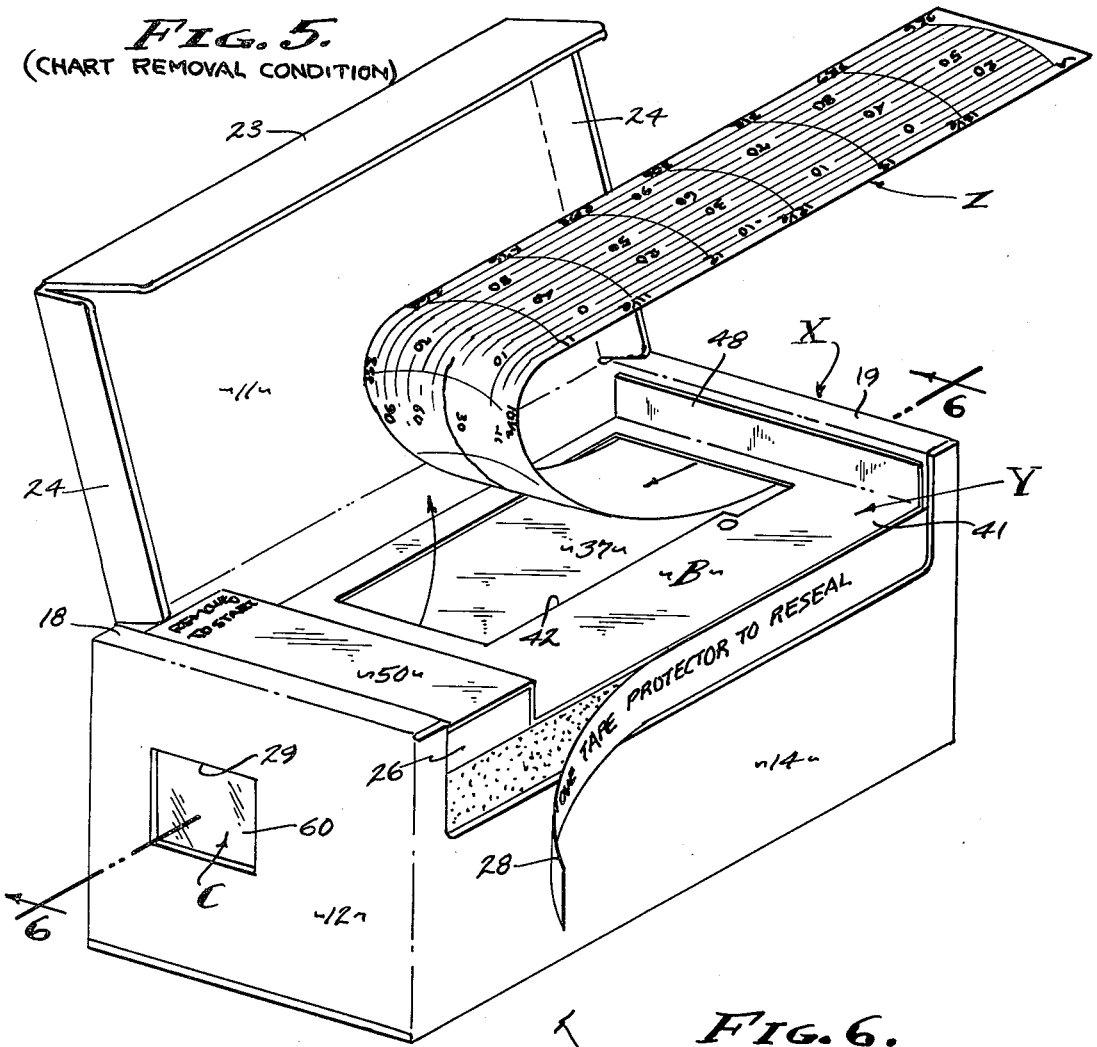

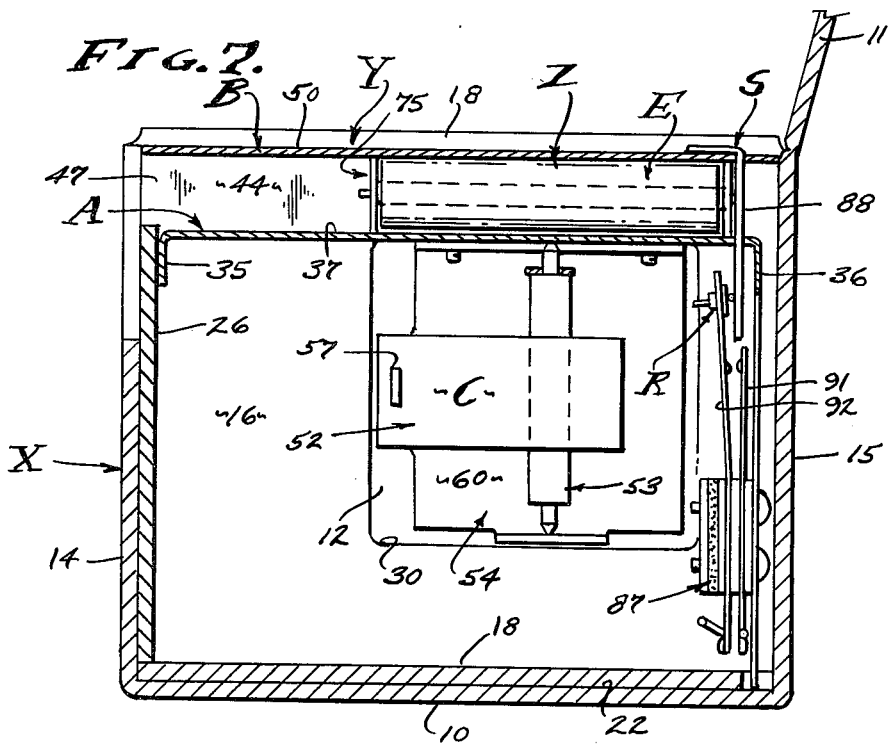
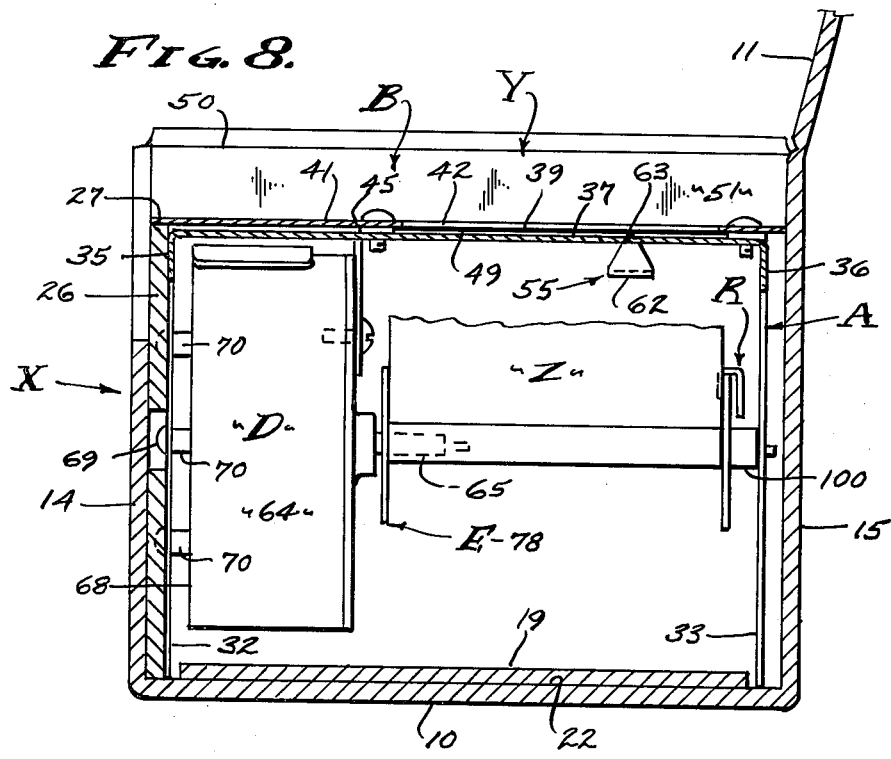

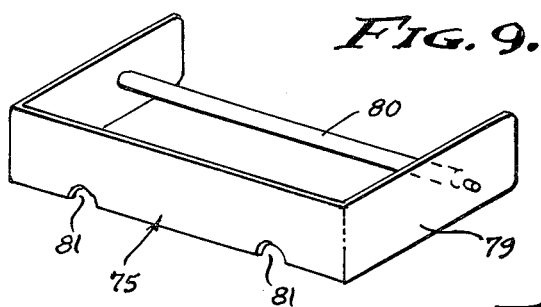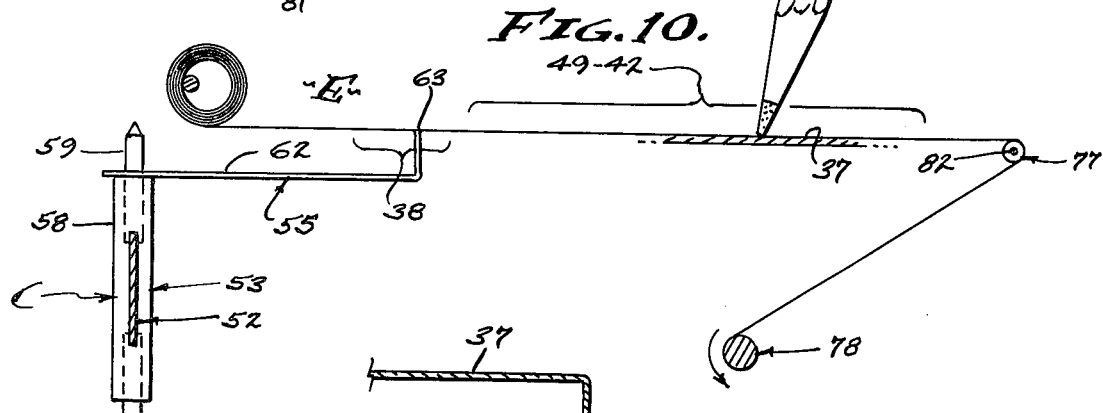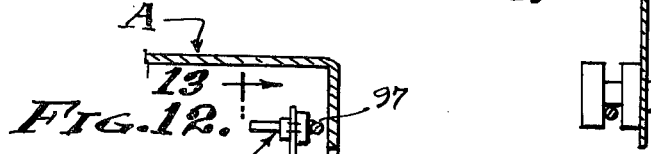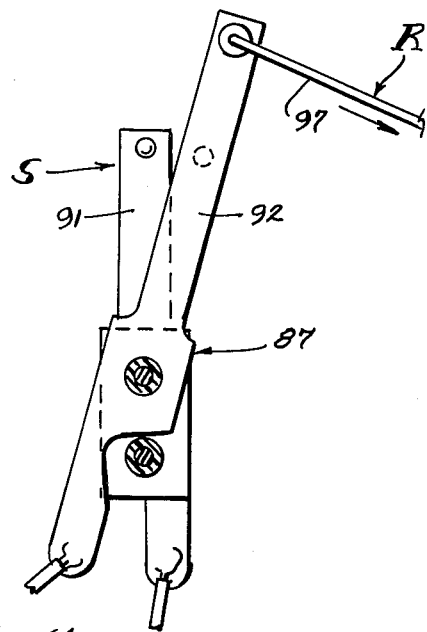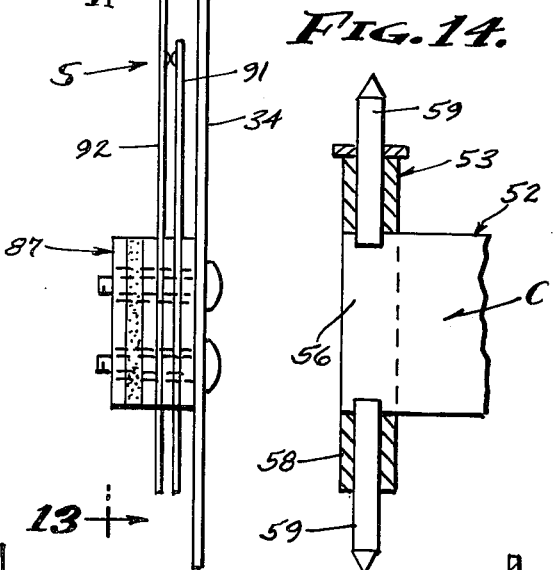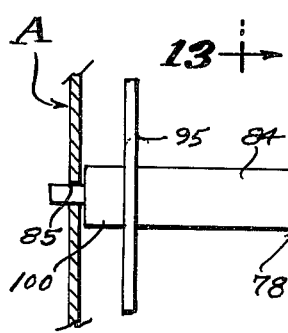

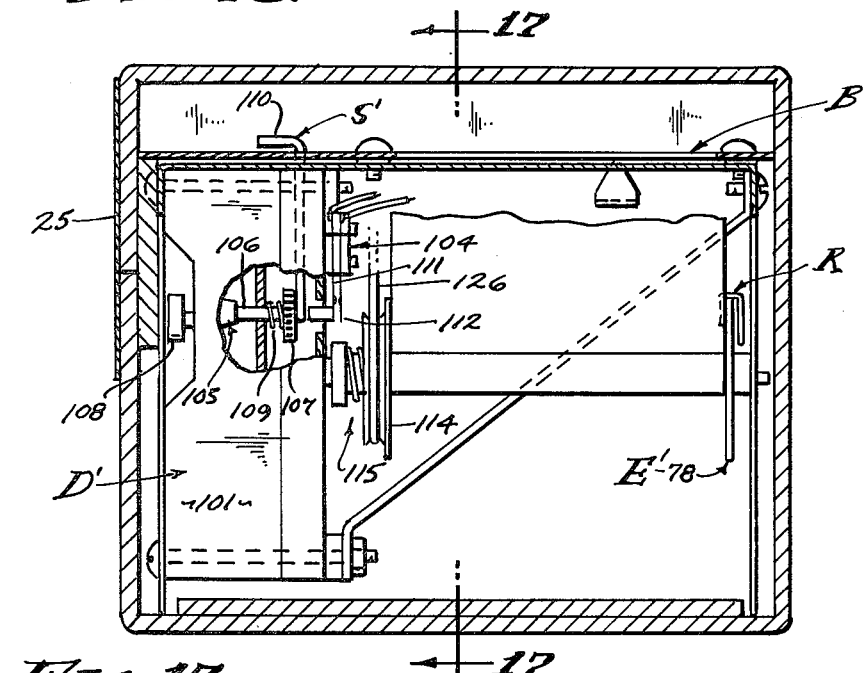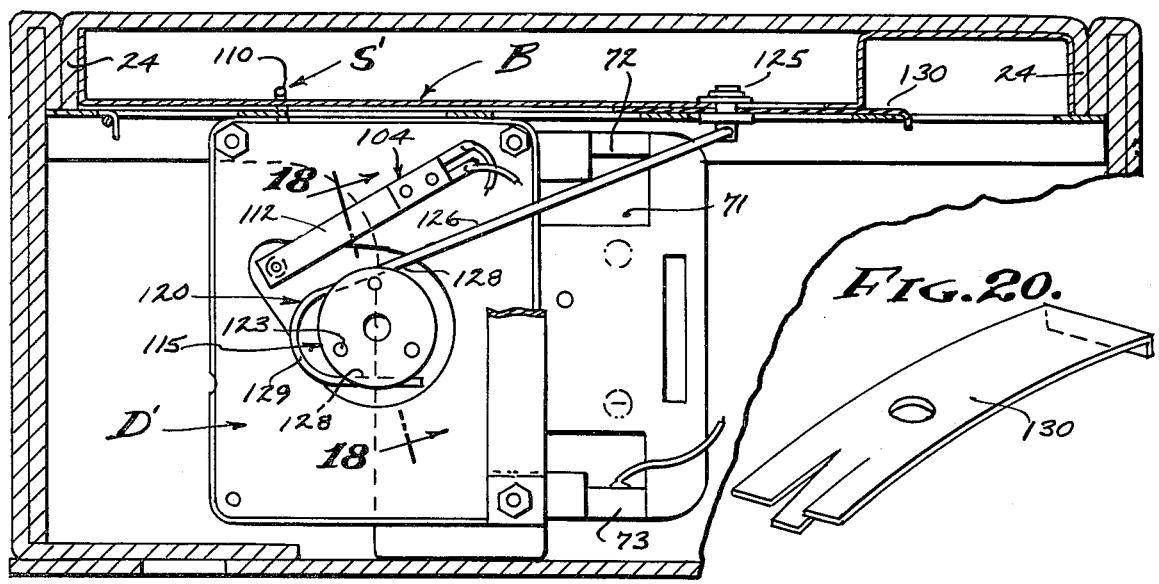

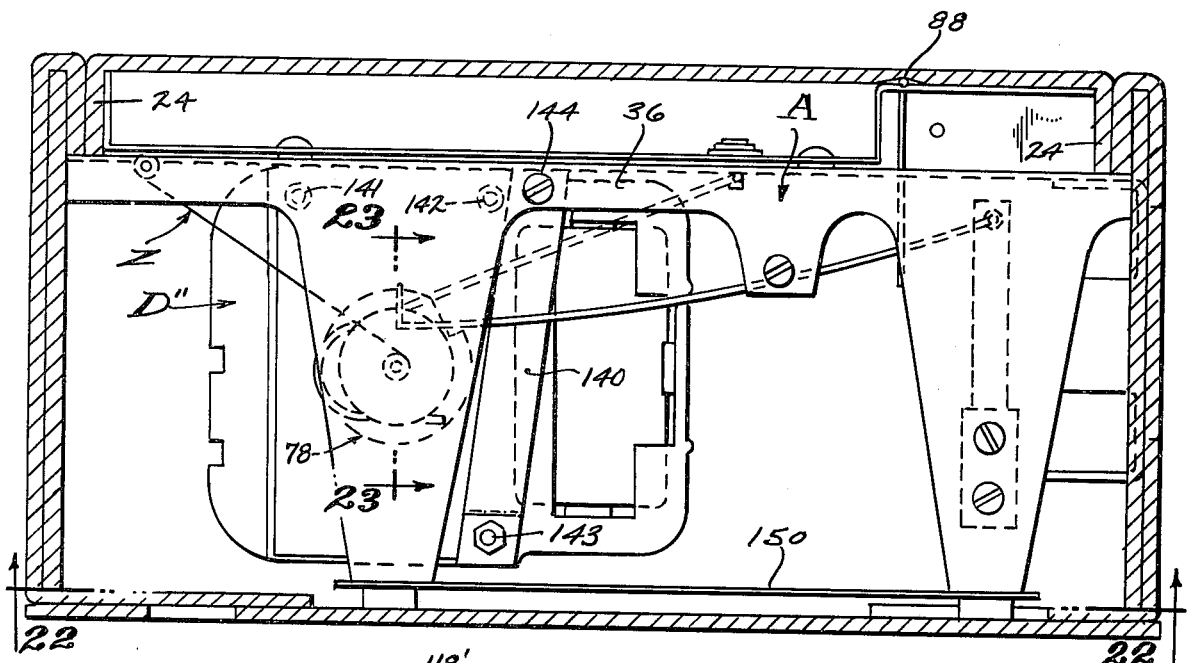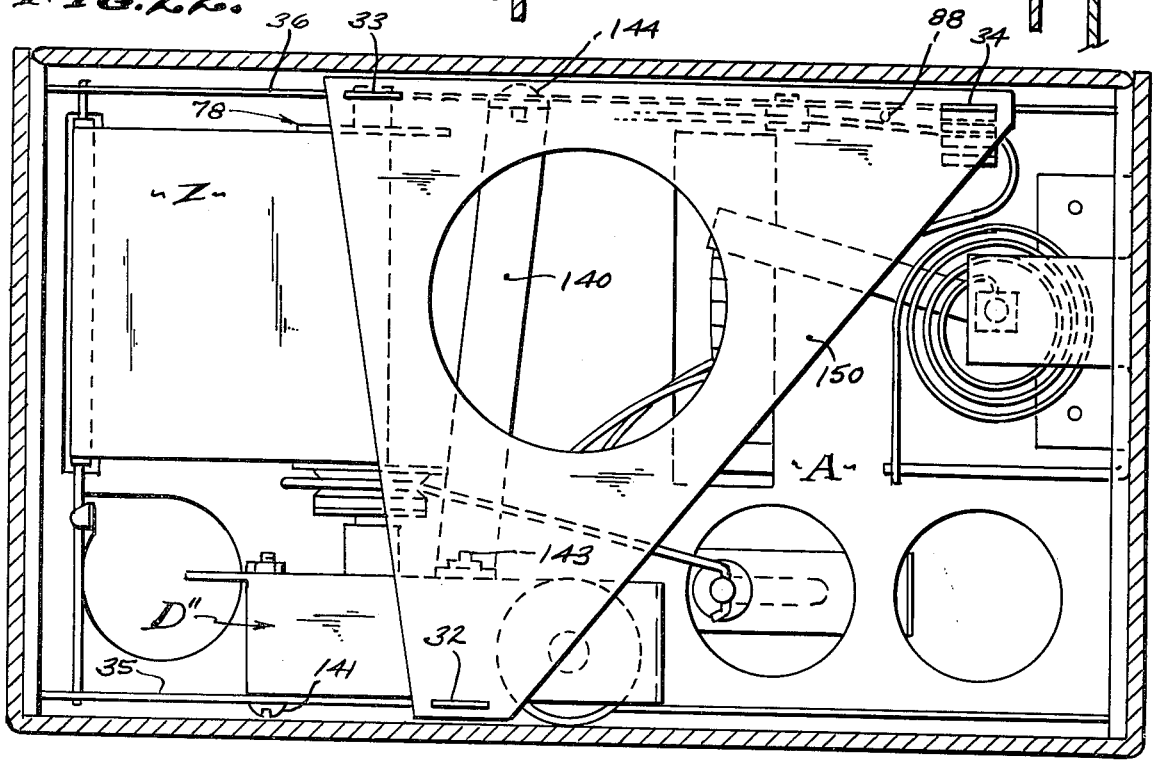

RECORDING THERMOMETER

BACKGROUND AND FIELD OF INVENTION

Recording thermometers are used for the protection of shippers and receivers of perishable goods as a guard over the temperature environment during transit. Various types of thermographs are employed and which are loaded and activated by the shipper and subsequently unloaded by either the receiver or a laboratory to which the instrument must be sent for analytical reporting. Needless to say, time is of the essence in receiving perishable goods on consignment, and subsequent analysis offered days late is of little real value; while the loading and handling of the instrument by unskilled persons results in malfunctions. For example, such instruments are often operated by spring motors which may be inadvertantly left unwound, or the chart inadvertently left disconnected from drive mechanism.

The in-transit shipment of such an instrument has for its primary purpose the function of monitoring the environmental temperature condition of the shipping compartment of a carrier, the said instrument being installed or packed with the goods to be protected thereby. Thus, the thermograph operation is highly advantageous to the shipper and receiver by providing a record of temperature related to time which is within the supervision of the carrier. However, the shipper and/or receiver cannot safely delegate operation of such an instrument to the carrier inasmuch as the assurance of a proper shipping environment cannot be entrusted to the person who is ultimately liable in the event of his irresponsibility. In practice, such instruments are deliberately tampered with by allegedly unknown persons, and obviously so for the purpose of destroying a probable incriminating recording; thereby shifting responsibility to the shipper, for example, in the event of damaged goods delivered to the receiver, when in reality the unproven fault lies with the carrier. The problem involves the seriousness of business transactions involving substantial money investments, and it is a general object of this invention to improve the business relations between shipper, carrier and receiver by eliminating doubt as to environmental temperature intransit, and all of which is beneficial to all concerned by indicating whether or not the intransit temperature was properly maintained.

Heretofore, instruments of the type under consideration have been weighty and difficult to handle, the mechanism thereof have been over engineered and merely an aggregation of the functions involved. For example, chart transferring means have been powered by drive means governed by a time piece, spring wound for activation or switch controlled for electrical operation, and all housed within a casing. In the interest of protection, the casing completely encases the instrument so that the temperature change must penetrate therethrough and which does take time. However, the time duration of a temperature condition is of the essence, and a time lag in its recordation should not be tolerated. Furthermore, prior art instruments that are so encased are also protectively housed within containers which add to the temperature isolation and time delay in recordation. In other words, the prior art instruments for this purpose rely upon heat absorption through weighty structure and are extremely slow to respond. Therefore, it is an object of this invention to directly expose the thermometer to the surrounding air temperature, and to simultaneously incorporate all the encasement and protective features into one shipping container which is also the housing and/or physical body of the instrument, with the thermometer per se directly exposed to the surrounding environment.

The loading and handling of prior art thermograms is a field problem to the shipper who must rely upon inexperienced personnel. Reference is made to the written information which is to be applied to the chart in order to associate it with the goods and the instrument into which it must then be loaded. It is this association which must be accomplished at the moment of departure, it being an object of this invention to provide a pre-loaded instrument in which the chart has been installed and a portion thereof exposed upon a table for receiving scribed or written information associating the factors involved in the shipment. Heretofore, verifying copies of information so placed upon the chart at the moment of departure have not been available, and it is an object therefore to provide a manifold through which a person can write upon a prepared form which establishes the required associated information. The manifold copies are then available to the shipper, carrier, receiver and to the instrument laboratory responsible for its operation and maintenance.

The starting of the prior art thermographs has involved the winding of spring motors or the operation of switches as by means of special mountings; all of which is directed to avoiding reliance upon personnel but not at all fool proof. For examples; the person loading the thermograph will forget to wind it, or the person mounting the thermograph will neglect to set it properly in its mounting. Therefore, it is an object of this invention to provide a temperature recording thermometer, a thermograph, that is self-energized by the most fundamental and simplified act of pulling a release pin, which may then be discarded, and in no case will its replacement cancel the "start." Thus, manual winding or the operation of control switches is eliminated, and there is no reliance upon complicated mountings that control operation.

The in-transit sealing of thermographs for the purpose of rendering them tamper proof has not been altogether satisfactory, since the characteristic solid and heavy closed structures thereof do not entirely eliminate tampering. For example, knowledgeable persons who wish to disturb operation of such instruments find ways to secretly enter sufficiently to destroy the the production of a reliable thermogram. It is, therefore, an object of this invention to provide a seal that is so related to the closure of the instrument container that its undamaged condition is a warranty that no attempt at entry was made. With the present invention, the container is a folded box wherein there are no through passages to the interior when associated with the instrument frame which it supports. Any attempt to insert an instrument therethrough is readily detectible, especially when such damage is externally visible upon a freshly applied container as is required when practicing this invention.

The determination of operation has been a problem with prior art thermographs, from the standpoint of removing the thermogram therefrom, and stopping the drive mechanism thereof, and in re-shipping of the instrument to its source of supply. Removal of the thermogram normally requires partial disassembly while stopping of the drive is not always attempted, and while re-shipping usually entails a separate container which may or may not have been preserved by the carrier. As to drive operation, usually a clock movement, return in the mails or by any public carrier raises the question of its being a timed explosive device. Therefore, it is an object to provide a thermograph from which the thermogram is extractible without dismanteling in any sense; merely by cutting a paper seal and by opening a lid, the thermogram being exposed for its then obvious mode of extraction. Cooperatively with the foregoing objective it is also an object to utilize extraction of the thermogram as the motivating function operating to automatically deactivate the drive means that transported the chart during the shipment of goods. It is still another object of this invention to incorporate a re-shipment seal which remains intact with the instrument container during its utilitarian period as a thermograph, and which is available to be conditioned and used to re-seal the instrument within its container-housing for re-shipment to its source for subsequent re-establishment as a pre-loaded instrument.

Further, it is an object to provide a preloaded and easily operated thermograph of the character thus far referred to, which is economical in all of its aspects of manufacture, distribution, use and return for re-cycled distribution, etc. With the present invention, the fewest number of static and dynamic parts are fully integrated and so combined to perform their correlated functions with assurance of results, and the resulting lightness in weight coupled with the suspension of the instrument frame within the container-housing provides for protective shock resistance.

SUMMARY OF INVENTION

The thermograph of the present invention is a pre-loaded instrument involving, a table over and upon which the chart is supported for receiving written information independent of a platen under which the chart is transported for receiving temperature recordings, and a time piece drive for transporting the chart over the table and under the platen and onto a storage spool, there being start means that commits the instrument to operation whereupon the container is sealed and made impenetratable during the recording shipment period, in one form there being a chart release, and there being a stop means that automatically deactivates the instrument upon opening of the container and in response to extraction of the thermogram chart through a window in the platen and thereby exposing it for inspection, said container being subsequently resealable for return shipment.

DRAWINGS:

The various objects and features of this invention will be fully understood from the following detailed description of typical preferred forms and applications thereof, throughout which description reference is made to the accompanying drawings, in which:

FIG. 3 is a view similar to FIG. 1 showing the recording thermometer as it is used.

FIG. 4 is a longitudinal sectional bottom view taken as indicated by line 4—4 on FIG. 3.

FIG. 5 is a view similar to FIG. 1 showing the recording thermometer after it is used and preparatory to re-sealing for return shipment.

FIG. 6 is a longitudinal section view taken as indicated by line 6—6 on FIG. 5.

Figure 1:
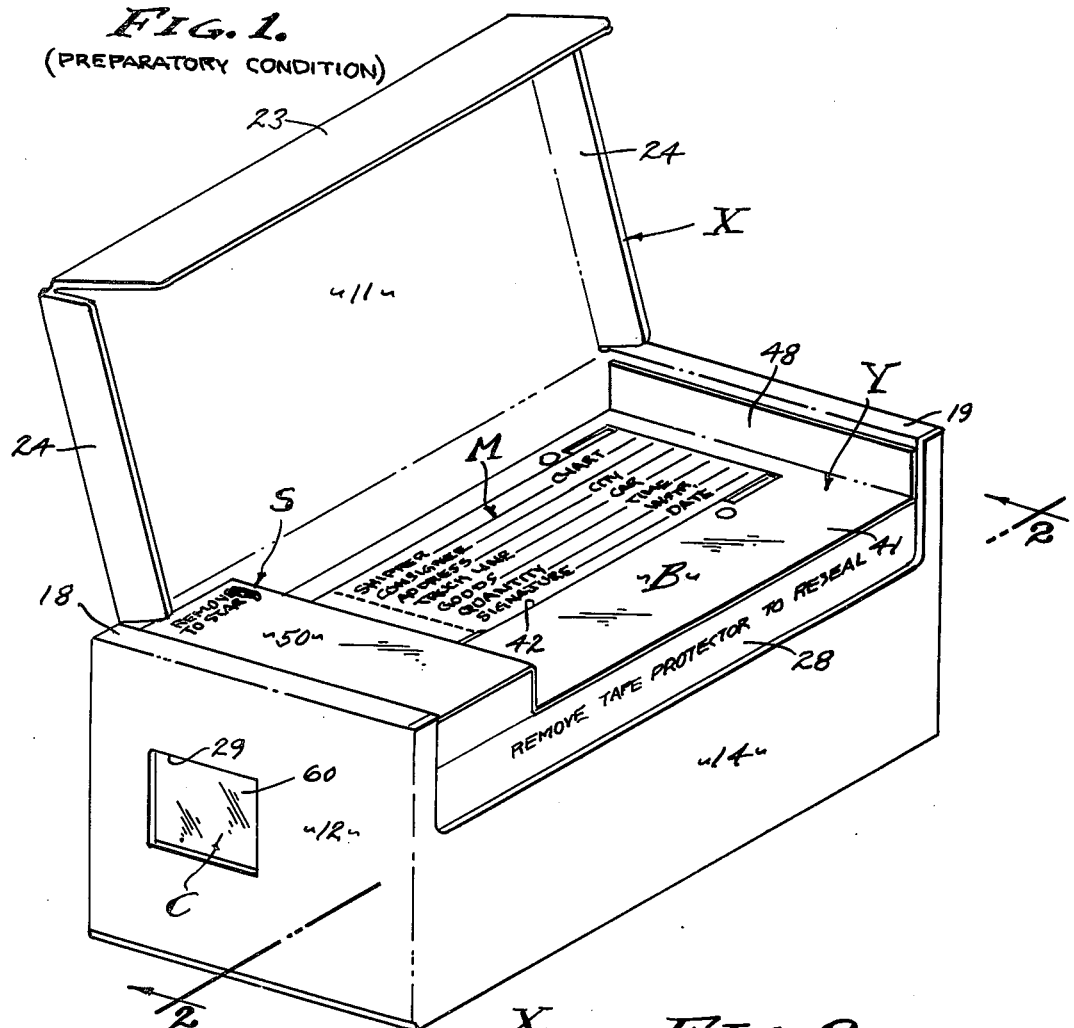
FIG. 1 is a perspective view of a first embodiment of the recording thermometer, showing it opened preparatory to use.
Figure 2:
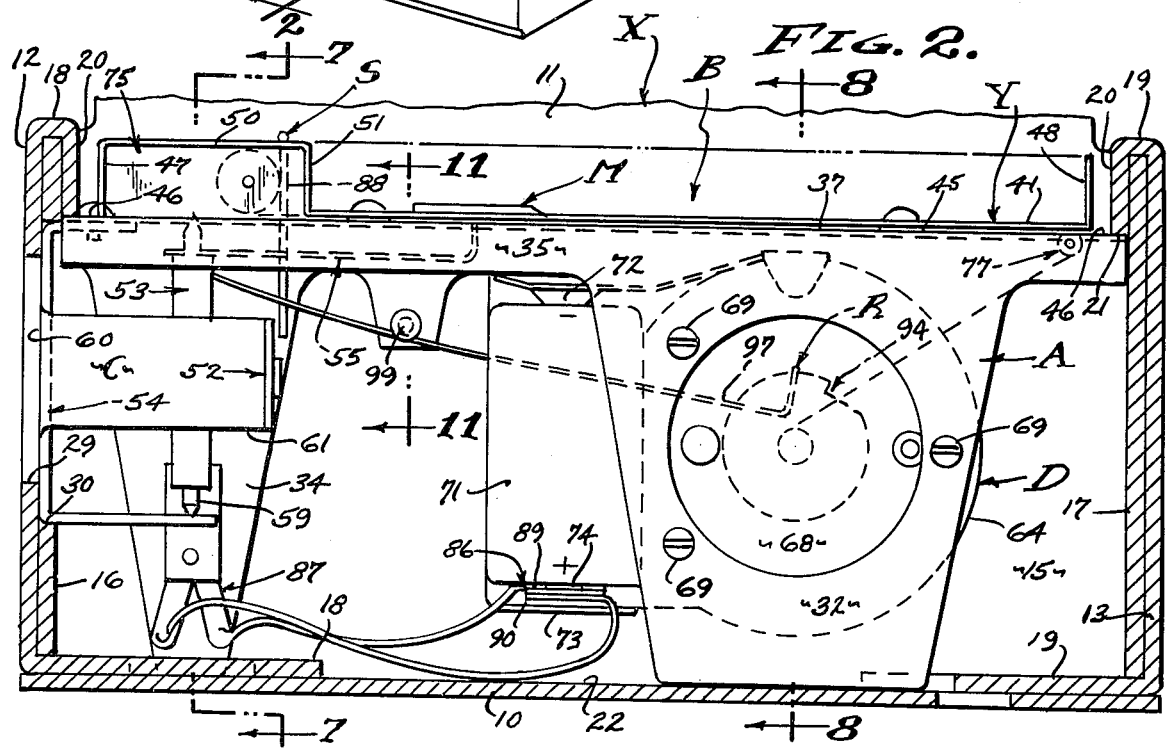
FIG. 2 is a longitudinal sectional view taken as indicated by line 2—2 on FIG. 1.

FIGS. 7 and 8 are transverse sectional views taken as indicated by lines 7—7 and 8—8 on FIG. 2.

FIG. 9 is a perspective view of the chart supply means.

FIG. 10 is a fragmentary view taken longitudinally of the recording thermometer and showing the essential elements thereof and their relationship to the chart that is transported therethrough, the application of a writing instrument being shown.

FIG. 11 is an enlarged detailed fragmentary sectional view taken as indicated by line 11—11 on FIG. 2.

FIG. 12 is an enlarged detailed fragmentary sectional view taken as indicated by line 12—12 on FIG. 6.

FIG. 13 is a side elevation taken as indicated by line 13—13 on FIG. 12.

FIG. 14 is an enlarged fragmentary sectional view taken as indicated by line 14—14 on FIG. 6.

FIG. 15 is an enlarged sectional view taken as indicated by line 15—15 on FIG. 6.

FIG. 16 is a view similar to FIG. 7, illustrating a second embodiment of the recording thermometer showing it closed and sealed for use.

FIG. 17 is a longitudinal sectional view taken as indicated by line 17—17 on FIG. 16.

FIG. 18 is an enlarged fragmentary sectional view taken as indicated by line 18—18 on FIG. 17 and showing the clutch thereof engaged.

FIG. 19 is a view similar to FIG. 18 showing said clutch disengaged.

FIG. 20 is an enlarged view of the clutch control positioning spring removed from the structure.

FIG. 21 is a longitudinal sectional view similar to FIG. 17 showing a third embodiment of the recording thermometer.

FIG. 22 is a bottom sectional view taken as indicated by line 22—22 on FIG. 21, and FIG. 23 is an enlarged transverse fragmentary sectional view taken as indicated by line 23—23 on FIG. 21.

PREFERRED EMBODIMENT:

Referring to the first form of this invention as shown in FIGS. 1 through 15, the recording thermometer as it is herein disclosed comprises, generally, a container-housing X, an instrument Y and a chart Z. The container-housing X receives the instrument Y and protectively encloses the instrument while providing access for its use and exposure for its sensitive operation; the container-housing being an expendible part especially adapted to a one time use. The instrument Y is captured within the container-housing X and is a powered unit that is prepared for its potential operation when loaded with the chart Z. In its preferred form, the instrument Y is electrically operated and includes a power supply in the form of a battery installed in the unit. The thermograph in its preferred form has all the necessary potential for full operation, including its return for reconditioning and subsequent use; the start means, business forms and sealing means being included therein for its recording shipment and for its return shipment as well. A feature of the present invention is the provision of a business manifold M which provides multi-copies including copy on the chart which is subsequently processed into the thermogram.

Briefly, the container-housing X and the instrument Y are independently prepared, and the latter is then installed permanently (for a single chart use) into the former. When the thermograph has been delivered to the shipper and is to operatively depart in the temperature environment of the goods which it is to protect, the manifold M receives the written information associated with the shipment and which is transferred onto the chart, and after which the manifold copies are removed, a start means S operated and a warranty seal W applied so as to close the container-housing. When the shipment arrives to the receiver thereof, he breaks the warranty seal W and manually withdraws the thermogram chart, there being stop means R that automatically responds thereto to deactivate the instrument unit. The instrument unit X is now used and is devoid of a chart, and is then returned to its source by resealing its previously opened closure and forwarding the same by mail or the like. Reconditioning of the thermograph at the source thereof commences with removal of the container-housing X which is discarded and replaced anew following reconditioning of the instrument Y loaded with a new chart Z.

Referring now to the container-housing X that cooperatively receives the instrument Y prepared and loaded with a chart Z, a light-weight protective enclosure is the primary objective; and to these ends I have provided a paper box, preferably of corrugated cardboard, having a unique flat pattern folded so as to be self-locking and to permanently capture the instrument Y in position housed therein. In practice, the container-housing X is completed and the instrument Y forcibly snapped into working position therein, there being depending internal flaps at opposite ends of the container-housing that engage the instrument frame to hold it depressed and in supported engagement upon the floor at the bottom of the container-housing.

The container-housing X involves, generally, a bottom 10, a top 11, ends 12 and 13 and sides 14 and 15, while the interlocking function involves inner ends 16 and 17 that engage within the confines of bottom and top extensions 18 and 19 projecting from the ends 12 and 13. The captured positioning of the instrument Y is accomplished by means of depending continuations of said top extensions 19, taking the form of flaps 20 that lie contiguously against the inner side of the inner ends 16 and 17 and characterized by a downwardly faced shoulder 21 opposed to the floor 22 established by bottom 10. Shoulders 21 are in a common plane spaced downwardly from the top 11 and parallel with said top and the floor 22 of the bottom 10. The front side 14 is cut out along its top margin to receive a coplanar flap 23 that depends from the top 11 in the form of a lid hinged to the back side 15, there being depending flanges 24 at opposite ends of the top to lie against inner faces of the flaps 20 when the lid is closed. It is the flaps 23 that are employed to close the container-housing X; firstly by means of a sealing tape 25 of paper or the like applied over the line of joinder between the front side 14 and said coplanar flap; and secondly by means of cementing or adhesion to a separate liner 26 that extends upwardly from the floor 22 between the inner ends 16 and 17. As shown, the liner 26 has an upwardly faced edge 27 disposed immediately below (a metal thickness) the plane of shoulders 21. In practice, contact cement covered by a removeable protective film 28 is applied to either the outside of the exposed liner 26 or to the inside of the top flap 23, and the liner 26 is cemented or otherwise secured to the inside of front side 14.

In accordance with the present invention, the end 12 is provided with a window 29 for the exposure of the thermometer hereinafter described, while the inner end 16 is provided with a complementary window 30 of larger size providing a substantial overlap for impenetrable closure. And according to usual practice the fabrication constituting the container-housing X is one integral piece of material, with the exception of the liner 26, with the lines of joinder between the parts thereof established by right angularly related scoring, as shown. The integrity of the container-housing can be supplemented by fastening the parts thereof one to another, as circumstances require, and all to the end that a composite protective enclosure of light weight is especially adapted to receive and permanently capture the instrument Y next to be described.

Referring now to the instrument Y that is received by and permanently captured within the confines of the container-housing X, a light weight reuseable thermograph is the primary objective; and to these ends I have provided a fabrication of light metal, preferably of sheet aluminum, which has the unique character of providing a table over and upon which a chart is supported for receiving written information and a platen under which the chart is transported for receiving temperature recordings, and which is adapted to be preloaded with the potential and all facilities for one complete cycle of operation. The instrument Y involves, generally, a frame A, a facia B, a thermometer C, a timed drive means D, a chart transport means E, a start means S, and a stop means R. The static parts of the structure are the frame A and overlying facia B, and the heat sink of the thermometer C, and all of which are secured together by means of self-tapping screw fasteners or the like, as shown. The timed drive means D is carried by the frame A with its drive axis normal to the disposition of the transport means E that is established in the frame and between the frame and facia. The start and stop means S and R are integrated in a single switching device responsive to manual actuation so as to commit the instrument to operation and thereafter responsive to manual withdrawal of the chart so as to automatically deactivate the instrument.

The frame A is preferably a sheet metal part that is die cut and formed to have a table 31 with depending legs 32, 33 and 34 strategically placed and proportioned for the weight and functions involved. These three legs support the table during manufacture and during reconditioning of the instrument Y as a unit, and also support the table when the instrument Y is captured within the confines of the container-housing X. The frame is made of thin material that is channel-shaped in transverse cross section for rigidity, there being rails 35 and 36 at the front and back edges and from which the legs are continuations. When viewing the instrument from the front side 14 it is preferred that the chart Z be transported from left to right over the table top 37; and in accordance with this invention the chart passage of transport means E is confined to and above the plane of the table top 37, while the thermometer C, drive means D and associated start and stop means S and R are all located below the table 31. The facia B cooperates with the frame A to establish the chart passage of means E and said chart supply, while the legs 32 and 33 are located toward the right hand end of the instrument to carry the timed drive means D which draws the chart from left to right. The leg 34 is located toward the left hand end of the instrument to carry the start and stop means S and R which are thereby spaced from the means D for purposes later described. In each instance, the legs have a foot in a common supporting plane, the foot of leg 32 being of substantial extent so as to bear the weight of means D, the heaviest component involved. As shown, the leg 32 is wide and with a circular mounting, a screw circle comprised of three holes, located on an axis spaced downward from and parallel to the table 31 and top 27. The leg 33 is transversely opposite the leg 32 and has a bearing opening concentric with said axis, the drive axis of means D. A feature of the frame A is the thermometer access opening 38 therethrough, extending transversely the width of chart Z and located toward the left hand end of the frame, thereby exposing the platen portion of the facia B next to be described. Another feature of the frame A is the transport passage 39 therethrough extending transversely the width of chart Z (with clearance) and spaced inward from the right hand end of the frame. Lightning holes 40 perforate the table 31 along the front side thereof and out of alignment with the transport means E.

The facia B is preferably a sheet metal part made in the same manner as frame A and formed so as to present a desk top 41 with an aperture 42 through which a person can write upon the table top 37, so as to establish a chart passage 39 for the transport means E, and so as to provide a storage chamber 44 for the chart Z. The facia B is essentially a flat panel that overlies the table 31 and is spaced from the top 37 thereof so as to permit the free passage of chart Z. Guide washers 45 at opposite sides of the passage 43 determine the passage clearance and also guide the chart Z, there being guide washers 45 at both the passage entrance and passage exit. The aperture 42 occupies a substantial area more or less coextensive with the width of chart Z and preferably with side margins overlapping the edges of the chart. Longitudinally, the aperture 42 extends between the thermometer access opening 38 and transport passage 39 without overlapping the same, thereby preserving an imperforate top 37 within the sight of the aperture 42. The opposite ends of the facia B terminate short of the frame ends respectively, thereby to present an upwardly disposed face 46 at each end of the instrument to be engageably secured by the shoulders 21 of the container housing X. In practice, flanges 47 and 48 project normal to the plane of facia B, at each end thereof, and spaced inward from the ends of the frame distances equal to the two material thicknesses of the container-housing X, thereby to accommodate and back the flanges 24 depending from the top 11.

In accordance with this invention, I incorporate a platen in the formation of the facia B, established by maintaining an imperforate area 49 in the panel thereof overlying the aperture 42 in frame A. The area 49 is coextensive with the aperture 42 and provides a surface upon which the chart Z can bear. The storage chamber 44 is established to the left of said area 49, to precede transport of the chart Z through the passage 43, and comprises an upwardly offset end portion 50 of the facia which lies beneath the top 11 of the container-housing X. As shown, a vertical wall 51 extends from the facia to carry the end portion 50, and to the end that an empty chamber 44 is defined by the top 37, flange 37, portion 50 and wall 51; a chamber adapted to receive the holder of means E and spindled supply of chart Z. As shown, the flange 48 projects upward from the facia while the flange 47 projects downward therefrom to form a columnar support and preventing depression of portion 50.

In accordance with the present invention, I provide the thermometer C which comprises a temperature responsive element 52, a mounting means 53 for said element, a heat sink 54 coupled to said element and exposed to the temperature environment to be sensed, and a recording means 55 adapted to transpose the environmental temperature onto the chart Z. The temperature responsive element 52 is preferably a bi-metal part in the form of a spiral spring with convolutions eminating at a live center 56 and extending to an anchored peripheral end 57. The bi-metal element 52 is a lamination of two metals having relatively high and low coefficient of expansion, the laminations being joined together at their interfaces with the low expansive material at the inside and the high expansive material at the outside of the spring. The live center 56 is notched at its opposite margins and the mounting means 53 comprises an elongated hub 58 with a transverse slot diametrically therethrough to receive the end portions of the spring. The opposite ends of the hub are coaxially bored to receive bearing pins 59 which are pressed therein to enter the notches in the spring, thereby locating the pins while locking the spring onto the hub. The bearing pins 59 are cone pointed to establish needle bearings when fitted into complementary tapered holes in the frame A and heat sink 54 next to be described.

The heat sink 54 is a metal part of substantial body, preferably aluminum, with a wall 60 exposed at the window 29 and embraced within the complementary window 30. The heat sink 54 is essentially a bracket that is secured to the frame A and which depends therefrom to present a bearing opening on an axis coincidental with and opposed to a bearing opening in said frame. Thus, the assembly of the hub 58 with its bearing pins 59 is accomplished by fastening the heat sink to the frame with the bearing pins in working position. The thermo couple of the heat sink 54 to the bi-metal thermometer spring is established at the anchored peripheral end 54 thereof, where the element 52 is pierced to receive a shouldered arm 61 projecting integrally from the wall 60. A projection at the terminal end of arm 61 enters the pierced opening in the spring and is sweged and/or riveted, and to the end that heat transfer is direct between the wall 60 and element 52.

The recording means 55, in accordance with this invention, records temperature directly upon the chart Z in response to rotative angular displacement of the hub 58, as effected by the bi-metal thermometer spring 52 in response to environmental temperature changes. The means 55 is a stylus comprised of a flat spring member 62 with an opening therethrough pressed onto the bearing pin 59 that is engaged with the frame, thereby placing the member 62 adjacent and parallel to the frame. The member 62 extends to the aperture 42 where it carries a point 63 that is yieldingly urged into pressured engagement with the chart Z as it passes under the platen. Thus, it will be seen that the thermometer element 52 directly places the stylus point 63 without the intervention of any means or mechanism whatsoever.

The timed drive means D is a prime mover that operates on stored energy to transport the chart Z under the platen area 49 and over the table top 47. The method of energy storage can vary, that is a spring motor or the like can be employed, and the timing function can be any suitable time piece that governs the rate of movement. In practice, a battery operated time piece is employed as the means D and preferably an electric clock unit that comprises a case 64 within which there is a gear train timed by an escapement and motivated by a spring that is periodically tensioned by an electro magnet. The electro magnet is energized momentarily each and every time the said spring reaches minimum tension, and its energization is mechanically coupled to wind the spring to maximum tension, the function of winding reoccurring each few minutes while the clock continues to operate.

The time piece mechanism herein disclosed can vary widely, the only requirement being that a drive shaft 65 project from the case 64. Normally, such a drive shaft 65 is tubular for the support of an hour hand which revolves once every 12 hours, there being a coaxial minute shaft projecting from within the tubular shaft 65 for the support of a minute hand. The said minute shaft is not used herein and is not interfered with, the hour drive shaft 65 being usefully employed and which in practice projects from a shoulder 66 more or less coincidental with the frame face 67 of the clock unit. A typical clock unit of the type under consideration is shown, wherein the case 65 is an elongated cylinder having a front face 67 and a back face 68 in spaced parallel planes, the drive shaft 65 being on the center axis thereof which is to be concentric with the operational axis of the instrument Y as hereinabove described. Accordingly, the above described screw pattern of leg 32 receives complementary mounting screws 69 threadedly engaged into the case 56 through spacers 70 that locate the drive means D on an operational axis. Such clock units are commercially available (as described) and include a power supply in the form of a battery 71 with opposite terminals engageably captured between contact clips 72 and 73. As shown, the clip 72 is a grounded part of the frame face 67 while the clip 73 is separate electrically insulated part. In the instance shown, the clip 72 is engaged with the positive terminal 74 of the battery 71, which terminal is in the form of a projecting button and which feature is advantageously employed as will be described. The said clips 72 and 73 are yieldingly urged into pressured endwise engagement with the battery terminals and capture it in working position held intact with the clock unit which comprises the drive means D.

The transport means E is provided to guide the chart Z beneath the platen area 49 and over the table top 37, and comprises generally a chart supply means 75, the guide washers 45, a pulley means 77 and a spool means 78. The said guide washers space the facia B from the frame A so as to establish the transport passage 43 through which the chart Z is moved at a timed rate of travel by the drive means D. In accordance with this invention, the chart is an elongated strip of pressure writing paper furnished in spindled form with the sensitive side outside the winding thereof. A typical section (the beginning) of the chart Z is shown in FIG. 4 illustrating the nature of the grid which is to be employed in processing the same into the thermogram. The above described hub 58 and its bearing pins 59 are disposed on an axis of rotation that is normal to the spaced planes of the frame A and facia B, and is positioned centrally of the transport passage 39, and from which disposition the spring member 62 revolves so as to displace the scribing point 63 through an arc. Thus, the grid of chart Z involves transverse time stations of arcuate form spaced at longitudinal increments as determined by advancement of said chart onto the spool means 78. The chart grid also includes longitudinally disposed parallel lines spaced according to the angular displacement of the scribing point 63 as related to the scale of temperature measurement employed, preferably in degrees Fahrenheit. For example, the center of chart Z is a 40° F line, while the extreme margins are −20° F and +100° F respectively; a range satisfactory for perishable foods such as produce and the like.

Referring now to the transport means E, the chart supply means 75 is adapted to hold the spindled chart Z in alignment for advancement through the passage 43; bearing in mind that the instrument Y is pre-loaded at a laboratory in preparation for use in the field. Accordingly, the supply means 75 involves a holder 79 that releasably carries a pulley 80 upon which the spindled chart is confined in alignment with the passage 43. The holder 79 is a resilient sheet metal member that is U-shaped in plan configuration and open toward the passage 43, the side legs thereof having bearing openings that rotatably carry trunions projecting from the pulley 80. Pulley 80 is of small diameter readily inserted through the spindled chart, and said legs are spaced so as to guide said chart. In practice, the fastening screws which secure the heat sink 54 to the frame A are symmetrically spaced, one at each side of the passage alignment, and they are equally spaced from the wall 51. Said screws provide detent projections for the located retainment of the holder 79 within the storage chamber 44 and confined against said wall 51 between the end portion 50 and opposite top 37 of the frame. A recess 81 in the cross member of the holder presents opposite stops that engage diagonally with the screw head peripheries, thereby simultaneously centering and locking the holder 79 in working position. The end portion 50 of facia B is deflected so as to permit entry and removal of the holder.

The pulley means 77 of chart transport means E occupies the chart transport opening 39 and functions to direct the chart C from passage 43 into the area below the table 32. The opening 39 occurs beneath the facia B, so as to deter tampering, and the means 77 involves a roller coextensive with the width of chart C and with its periphery tangent to the top 37 and rotatably on a shaft 82 carried by the side rails of the frame. In practice, the chart Z is warped over the pulley means and turned approximately 150° and directed toward the spool means 78.

The spool means 78 of the transport means E is a take-up means that is driven so as to advance the chart Z through the passage 43. The spool means 78 comprises a flanged spacer 83 engaged over the tubular shaft 65 of means D and positioned against the shoulder 66 thereof, and a flanged drum 84 supportably journaled in a bearing opening 85 in the leg 33. The flanges of parts 83 and 84 are spaced apart so as to receive the chart Z therebetween, and they revolve on the operational axis of means D. A feature is the reversibly revolveable friction drive that is established between shaft 65 and drum 84 the latter having a resiliently expansible sleeve portion 85 receiving and telescoped onto said shaft 65 to be engageably positioned by the spacer 83. The frictional engagement between shaft 65 and drum 84 is such as to advance the chart Z while relinquishing to manual extraction of the chart from the spool.

The start means S is provided to commit the instrument Y to operation and is irreversibly operable to initiate operation of the drive means D. In the example illustrated and described, the clock unit of the drive means is electrical and includes the battery 71 with a positive terminal 74 in the form of a button, and in accordance with this invention I have provided a circuit separator 86, a control switch 87 and a release 88. The circuit separator 86 is comprised of a pair of complementary electrically insulated contacts 89 and 90, the former engaged with the battery terminal 74 and the latter with the contact clip 72. A layer of insulation separates the two contacts, the assembly thereof being downwardly cupped so as to maintain position upon the button-shaped terminal. The control switch has a pair of leaves 91 and 92 in a series circuit with contacts 89 and 90 through conductors as shown. The leaf 91 is electrically insulated from the frame A and from the leaf 92 by means of intervening plugs of dialectric material, one leaf being longer than the other and the two leaves carrying opposed contacts that are normally biased one against the other, the switch thus formed being normally closed. The release 88 is in the form of a pin engaged through the frame A and the facia B and projects beneath the longer of the two contact leaves to hold one from the other, the longer contact being that which is the ground side of the electric circuit. The said longer contact is deflected sufficiently for its withdrawn positioning and to the end that its release into normal contact with the other contact places it out of range of further engagement by the pin of release 88, in the event that said pin is reinserted. Thus, the drive means D cannot be deactivated once it is committed to operation.

Referring now to the stop means R, it will be observed that this means is intimately associated with the start means switch 87 hereinabove described. The means R comprises a ratchet 94 responsive to reverse motion of the spool means 78 to withdraw the leaf contacts of control switch 87 one from the other. In accordance with this invention therefore, the means R also comprises modification to the stack configuration of switch 87 hereinabove described, the modification residing in the separation and/or pressured engagement between the insulation blocks thereof and in the reformation of one of said leaf contacts so as to provide for lateral displacement thereof as occurs in a "knifeswitch." The drum 84 and its flange 95 revolve clockwise when the chart Z is being advanced and they revolve counter clockwise when the chart Z is manually withdrawn and retracted from the instrument Y. Accordingly, the ratchet 94 of stop means R involves at least one tooth 96 faced in the counter clockise direction, and a ratchet rod 97 extending from one of the leaf contacts of switch 87 and engageable in said tooth to be reciprocably shifted so as to disengage said contacts. The ratchet rod 97 is a straight member of resilient material, preferably of spring wire, having one end pivotably coupled to the longer leaf contact 92 by means of an electrical insulator 98. The other end of rod 97 has an inverted U-shaped configuration in a transverse plane normal to the axis of the rod and proportioned to ride over and upon the periphery of the flange 95, the cross member of said U-shape being biased against the flange by means of deflecting the rod with a guide 99 positioned intermediate its opposite ends.

The stack switch 87 is an assembly that involves spaced fasteners that project through insulating tubes which pass through the blocks and leaf contacts thereof. In accordance with this invention, one of the openings passing an insulating tube is deleted at one side of a leaf contact, whereby the said contact (92) is enabled to be revolved laterally by a corresponding movement of the rod 97. In practice, the switch 87 is mounted remote from the drum 84 and with its leaves in a plane substantially coincidental with the plane of flange 95, whereby shifting of the rod 97 in response to the counter clockwise rotation of flange 95 results in engagement of the ratchet rod by the tooth 96, resulting in reciprocal movement of the rod and which withdraws the leaf contact 92 laterally out of overlying alignment with the leaf contact 91. The reciprocal movement of rod 97 is limited by providing a hub 100 on the drum 84, between the flange 95 and leg 32, and upon which the rod 97 rides so as to be stopped and whereupon the cross member thereof is cammed radially outward by the angular face of the tooth 96 and positioned beyond the periphery of flange 95 as the drum continues to rotate. Thus, there is but one "switch-off" operation regardless of the number of retraction turns applied to the spool 78 when the chart Z is withdrawn from the instrument Y. As a result of the foregoing automatic operation, the timed drive means D of the instrument Y is deactivated prior to return shipment of the thermograph unit.

Referring now to the second form of this invention as shown in FIGS. 16 to 19, the recording thermometer herein disclosed comprises preferred improvements with respect to the timed drive means D', the chart transport means E' and the start means S'. In order to provide high torque and timing accuracy, I prefer to employ a battery operated electrically excited tuning fork drive that governs the rate of movement; a time piece that comprises a case 101 within which there is a gear train driven synchronously with a magnetic coupling reciprocated at a determined rate of oscillation by means of a tuned electronic circuit. In practice, a solid state circuit energizes a drive coil 103 at 300 c.p.s., which activates a tuning fork of substantial size sympathetic to that same frequency. Battery 71 is engaged between the contact clips 72 and 73, one of said clips 72 being in a series circuit through switch 87 (see first embodiment) of the stop means R which is operative as hereinabove described; and in accordance with this form of the invention, this battery circuit is also in series through a start switch 104 that is coordinated with the start means S'.

The drive means D' is a prime mover that involves a drive wheel with a circumferential series of radially staggered magnetic masses which are alternately attracted and/or repelled by radially reciprocal oscillations of an embracing magnet carried by the tuned fork. It is necessary therefore, that the drive wheel be accelerated to operating speed by auxiliary means so that the movement frequency of its circumferentially spaced masses coincides with the tuned 300 cycle excitation of the fork that carries said magnet through its embracing motions relative to the periphery of said wheel. Consequently, the drive means D' has a starter means 105 which in practice involves a dual purpose manual control in the form of a revolvable plunger 106. The plunger carries a pinion gear 107 within the case 101 and a manually engageable knob 108 at the exterior thereof. The said plunger 106 is slideably journaled in bearings in a frame (a typical clock frame) with substantial excursion capability, there being a spring 109 that yieldingly urges the plunger 106 inwardly. The pinion gear 107 is at the terminal inner end of the plunger, and manual withdrawal of the knob 108 at its outer terminal end shifts said gear into engagement with the gear train for rotative adjustment of the drive shaft 65, while a cam on the plunger (indicated) actuates a clutch means (not shown) which accelerates the gear train when the withdrawn plunger is released and accelerated by the spring 109; all in accordance with the usual functions of adjusting and manually starting the prime mover. However, the timed drive D' of the present invention is housed in the case 101, the knob 108 being totally inaccessible for security reasons.

In accordance with the invention, I have provided the start means S' which controls the plunger 106 and the start switch 104 coordinated therewith to close the electronic circuit through battery 71 when said control means plunger 106 is released. As shown, the start means S' irreversibly operates to commit the instrument Y to operation and involves a release 88' in the form of a pin 110 engaged through the frame A and facia B and projecting through the case 101 to hold the plunger 106 retracted against the potential energy of the compressed spring 109. In practice, the pin 110 engages the outside end of pinion gear 107 which moves out of alignment when released and is not reengageable by the pin, in the event that the pin is reinserted. It will be seen that the plunger 106 is manually retracted and that the pin 110 is inserted to hold the plunger 106 in operative abeyance subject to release by extracting said pin followed by propelling of the gear train. Thus, the drive means D' cannot be deactivated once it is committed to operation.

The start switch 104 of start means S' has a pair of contact leaves 111 and 112 in the series circuit shown. The switch 104 is normally open and is closed by the plunger 106 when in its expended and arrested position, there being an actuator post 113 that enters the case 101 to be engaged by the plunger after its release and consequent acceleration to its arrested position with simultaneous propelling of the gear train. Thus, the gear train and exciting circuit are simultaneously activated upon extraction of pin 110, and which starts the timed drive means D'.

The chart transport means E' of the second form of the invention provides for complete relinquishment in reversibly revolving the spool means 78. Means 78 is comprised of a flanged drum 84 and a drive flange 114 replacing the flanged spacer 83 hereinabove described, the flange 114 being fixed onto the drum 84, the spool means 78 comprised of drum 84 and flange 114 being releasably driven by the drive shaft 65. In accordance with this form of the invention, the transport means E' includes a disengageable clutch unit 115 in place of the reversibly revolvable friction drive hereinabove described, and which includes a drive flange 116, a clutch 117, a spring 118 and seat 119, and a manual release means 120 accessible at the front of facia B.

The drive flange 116 of the clutch unit 115 is fixedly placed onto the drive shaft 65 and has one or more drive openings 121 alignable with one or more complementary drive openings 122 in the spool flange 114. The clutch ring 117 is axially shiftable on a tubular extension of the flange 116 and carries one or more drive pins 123 that project through flanges 116 and 114 when the two said flanges are adjacently related. The spring 118 presses the flange 116 toward the flange 114 so as to project the pins 123, the seat 119 being fixed onto said extension of the drive flange.

In accordance with the invention, the manual release means 120 comprises a manually shiftable release button 125 that reciprocates a release rod 126 which separates the flanges 114 and 116, the said flanges having inclined perimeters 127 that face together forming a V-channel to receive said release rod. The release rod 126 is of a thickness, preferably round in cross section, so as to be drawn between the flanges 114 and 116 thereby withdrawing the pins 123 from the flange 114 when flange separation occurs. In practice, the release rod 126 is unique with the inclusion therein of a hooked end portion that embraces the clutch unit 115 and having divergent legs 128 that ride freely between the inclined perimeters 127 of the separable flanges 114 and 116. The divergent legs 128 are joined by a semi-circular portion 129 that ridges between the flanges when the button 125 is manually shifted to draw the leg 128 pivotally adapted thereto so as to cause the flange separation and consequent withdrawal of pins 123 from flange 114. As shown, the button 125 has a stem engaged through a slot in the facia B, there being a spring plate 130 interposed between the flange A and facia B to form a shield closure of the slot, a friction retainer for the button, and having a spring tab to lock the mechanism in the released position by engaging a stop on frame A. Thus, the button 125 and spring plate 130 snap into a locked clutch releasing position.

Referring now to the third form of this invention as shown in FIGS. 21 to 23, the recording thermometer herein disclosed is a marriage of the first two forms hereinabove described. The instrument Y of the third form is essentially a time temperature recording device that is battery operated and started automatically as in the first form, and has also complete relinquishment for releasably revolving the spool means 78. As indicated, the timed drive means D" can vary widely and in this form involves an oscillating Geneva movement that is selfstarting when electrical energy is applied through a pulsing circuit that drives the same; such a time piece having substantial torque and well suited for the purpose involved. Further, the manually releasable drive is the prefered one, and avoids any excessive restraint to withdrawal of the chart from the instrument when it is extracted so as to be observed and/or read.

From the foregoing it will be seen that I have provided a very practical thermograph that processes a chart so as to produce a utilitarian thermogram. The recording instrument is protectively captured within a container-housing, the combined instrument and container-housing being prepared at a laboratory or the like to have all requisites and the potential for a full cycle of operation. The instrument per se is characterized by the frame that carries the interrelated components and upon which the facia is superimposed as the desk element upon which written information is transcribed onto the chart. The pre-loaded instrument is forceably snapped into working position within the containerhousing, with the release pin 88 or 110 frictionally installed so as to hold operation in abeyance. The manifold M is a multi-form of pressure writing papers or carbon papers that are superimposed over the frame and in the aperture 42 where the top and/or back side of the chart Z is exposed. The shipper and receiver designations and goods information are written through the manifold which in practice can correlate the instrument and chart with the transaction involved. When the required information is transcribed, as above described, the start pin 88 or 110 is removed so as to commit the instrument Y to its operative cycle; whereupon the warranty seal W is applied over the lines of joinder between the top 11 and front side 14 of the containerhousing. The sealed instrument unit is then placed into the environment which is to be monitored, where it can be packed as a loose package or fastened to a supporting structure as by means of a contact adhesive applied over the bottom area and normally protected by a removeable film, as shown. Upon arrival at the shipment destination, the receiver of the goods breaks the warranty seal W and withdraws the chart Z for his inspection and satisfaction as to the temperature condition maintained by the carrier. In the first form of the invention, the reversibly revolvable friction drive functions to relinquish the chart Z which is withdrawn from both ends of the instrument Y through the aperture 42. In the second form of the invention, the releasable clutch unit 115 functions to irreversibly relinguish the chart Z which is withdrawn until the spool means 78 stops with the chart leader attached thereto, whereupon a tear line appears at the right hand straight-edge of the aperture 42 where the chart Z is torn loose. Reverse revolvement of the spool means 78 operates the stop means R deactivating the timed drive means D or D', and the used thermograph unit is then resealed and re-shipped to the laboratory source for destructive removal of the container-housing and for its reconditioning and reloading and assembly within a fresh container-housing for a subsequent cycle of operation.

Alignment and freedom of rotating parts and elements is an important feature of the present invention, and to this end the bracing of the second and third form of the present invention is significant. Referring to the second form of FIGS. 16 to 20 of the drawings, I have provided a brace which reaches diagonally from one side of the frame A to the lowermost extremity on the drive means D'', the said drive means being mounted to the rail 35 of the frame A by spaced fasteners 141 and 142 which establish a triangular pattern with a third fastener 143 at said lowermost extremity. As shown, the brace 140 is secured to the opposite rail 36 of frame A by a fastener 144; and all to the end that a pyramidal truss is formed for the rigid angular placement of the drive means D'' with respect to the frame A. Now referring to the third form and FIGS. 21 to 23 of the drawings, I have provided a spreader 150 which ties together the legs 32, 33 and 34 of the frame A, as is best illustrated in FIG. 22 which shows the planar configuration of the spreader that rigidly holds the lateral separation of the frame legs and which together with brace 140 establishes an aligned spaced frame A. Also, in the last and preferred form of the invention, the spring element 118' is resilient elastomeric or foamed plastic material such as polyethylene that presents a depressible pad between the drive flange 116 and spring seat 119' of the releasable clutch drive.

Having described only the typical preferred forms and applications of my invention, I do not wish to be limited or restricted to the specific details herein set forth, but wish to reserve to myself any modifications or variations that may appear to those skilled in the art:

I claim:

1. An instrument for recording a line variably displaced between opposite side margins of an elongated chart transported therethrough and adapted to be written upon, and including; a frame having an upwardly faced planar table portion supportably engaging the chart and having a transverse opening adjacent one end of the table portion and extending between the opposite side margins of the chart, a planar facia spaced from the table portion of the frame forming a chart passage therebetween and having a writing opening substantially coextensive with said planar table portion and having a downwardly faced transverse platen portion overlying the said transverse opening adjacent one end of the table portion of the frame, drive means transporting the elongated chart through said passage to pass beneath the platen portion of the facia, and a condition recording means comprising a stylus engageable with the chart through said transverse opening in the frame and displaceable between the opposite side margins of the chart to record a line thereon.

2. The instrument for recording a variable displaced line on a chart to be written upon as set forth in claim 1 wherein a temperature moveable element is coupled to a hub journaled on an axis normal to the platen portion of the planar facia by a bracket depending from the frame, the stylus being rotatably carried by said hub to record temperature on said chart.

3. The instrument for recording a variably displaced line on a chart to be written upon as set forth in claim 1 wherein a bi-metal thermometer is anchored to a bracket depending from the frame and is coupled to a hub journaled on an axis normal to the platen portion of the planar facia by said bracket, the stylus being rotatably carried by said hub to record temperature on said chart.

4. The instrument for recording a variably displaced line on a chart to be written upon as set forth in claim 1, wherein the instrument is contained within a housing having a window in one wall thereof, wherein a bi-metal thermometer is anchored to a bracket depending from the frame and is coupled to a hub journaled on an axis normal to the platen portion of the planar facia by said bracket, the stylus being rotatably carried by said hub to record temperature on said chart, and wherein the bracket is made of heat absorbing material and has a planar section of greater area than said window and having marginal portions thereof engaged against the inner side of said one wall, thereby exposing the bracket and anchored thermometer to heat conditions external of the housing.

5. The instrument for recording a variably displaced line on a chart to be written upon as set forth in claim 1 wherein a hub is journaled on an axis normal to the platen portion of the planar facia by a bracket depending from the frame, the stylus being rotatably carried by said hub to record on said chart.

6. The instrument for recording a variably displaced line on a chart to be written upon as set forth in claim 1 wherein a temperature moveable element is anchored to a bracket depending from the frame and is coupled to a hub journaled on an axis normal to the platen portion of the planar facia by said bracket, the stylus being rotatably carried by said hub to record temperature on said chart.

7. The instrument for recording a variably displaced line on a chart to be written upon as set forth in claim 1 wherein a spirally shaped bi-metal thermometer is statically anchored to a bracket depending from the frame and has a live end coupled to a hub journaled on an axis normal to the platen portion of the planar facia by said bracket, the stylus being rotatably driven by said hub to record temperature on said chart.

8. The instrument for recording a variably displaced line on a chart to be written upon as set forth in claim 1, wherein the instrument is contained within a housing having a window in one wall thereof, wherein a spirally shaped bi-metal thermometer is statically anchored to a bracket depending from the frame and has a live end coupled to a hub journaled on an axis normal to the platen portion of the planar facia by said bracket, the stylus being rotatably driven by said hub to record temperature on said chart, and wherein the bracket is made of heat absorbing material and has a planar section of greater area than said window and having marginal portions thereof engaged against the inner side of said one wall, thereby exposing the bracket and anchored thermometer to heat conditions external of the housing.

* * * * *